United States Patent [19]
Konno et al.

[11] Patent Number: 5,751,518
[45] Date of Patent: May 12, 1998

[54] HEAD FEEDING MECHANISM IN MAGNETIC RECORDING AND REPRODUCING DEVICE

[75] Inventors: Makoto Konno; Akira Shibata; Takashi Watanabe; Hisateru Komatsu, all of Yamagata, Japan

[73] Assignee: Mitsumi Electric Co., Ltd., Tokyo, Japan

[21] Appl. No.: 647,648

[22] Filed: May 15, 1996

Related U.S. Application Data

[63] Continuation of Ser. No. 457,737, Jun. 1, 1995, abandoned, which is a continuation of Ser. No. 275,719, Jul. 19, 1994, abandoned.

[30] Foreign Application Priority Data

Sep. 30, 1993 [JP] Japan ................................ 5-057930

[51] Int. Cl.$^6$ .............................. G11B 5/48; G11B 21/16
[52] U.S. Cl. .......................................................... 360/104
[58] Field of Search .............................. 360/102, 103, 360/104, 106

[56] References Cited

U.S. PATENT DOCUMENTS

| | | | |
|---|---|---|---|
| 5,166,846 | 11/1992 | Shigemoto | 360/104 |
| 5,187,624 | 2/1993 | Shigemoto | 360/104 |
| 5,198,945 | 3/1993 | Blaeser et al. | 360/104 |

FOREIGN PATENT DOCUMENTS

| | | | |
|---|---|---|---|
| 60-83254 | 5/1985 | Japan | 360/104 |
| 1285061 | 11/1989 | Japan | 369/244 |
| 5166159 | 7/1993 | Japan | 360/103 |

*Primary Examiner*—Stuart S. Levy
*Assistant Examiner*—William J. Klimowicz
*Attorney, Agent, or Firm*—Whitham, Curtis, Whitham & McGinn

[57] ABSTRACT

A head feeding mechanism in a magnetic recording and reproducing device comprises: a "0" side carriage which has a "0" side magnetic head mounted on the surface of the front end portion thereof, and is fed in the direction of length of a slot formed in a magnetic disk holder, into which a magnetic disk is loaded, by a guide provided on a device frame; and a "1" side carriage which has a "1" side magnetic head 16 mounted on the surface thereof which is confronted with the "0" side magnetic head, and a base which is flexibly supported on the base 1a of the "0" side carriage, and driven ears extended from the middle portion thereof which are driven by the edge of the slot with the aid of an energizing spring. In the mechanism, the "0" side carriage is formed rigid by molding resin, and has a flexible thin portion in the middle of the front end portion thereof which is much smaller in thickness than the other portions, and the "0" side magnetic head is soldered to a flexible printed circuit board with the flexible thin portion held between the "0" side magnetic head and the flexible printed circuit board.

22 Claims, 4 Drawing Sheets

HEAD FEEDING MECHANISM IN MAGNETIC RECORDING AND REPRODUCING DEVICE

This is a Continuation of application Ser. No. 08/457,737 filed Jun. 1, 1995, now abandoned, which was a Continuation of application Ser. No. 08/275,719 filed Jul. 19,1994, now abandoned.

BACKGROUND OF THE INVENTION

1. Field of the Invention

This invention relates to a magnetic recording and reproducing device with a magnetic disk as a recording medium, and more particularly to a head feeding mechanism in the magnetic recording and reproducing device.

2. Related Art

As is well known in the art, a magnetic recording and reproducing device with a so-called "3.5-inch floppy disk" as a recording medium employs a head feeding mechanism as shown in FIGS. 5 through 7.

In those figures, reference character 1A designates a "0" side carriage which is guided along a guide rod 4A provided on a device frame 3A which guide rod is extended in perpendicular with a slot 2a formed in a magnetic disk holder 2A. The "0" side carriage 1A is a rigid member in the form of a plate (flat dish) which is formed by pressing a thin metal plate.

A flexible leaf spring 6 is cantilevered through spacers 5 to the base 1a of the "0" side carriage 1A with a mounting bracket 7 and fixing screws 8A. The free end portion 6a of the leaf spring 6 is coupled to the base 9a of a "1" side carriage 9A with mounting screws 10, which is also a rigid member formed by pressing a thin metal plate. The "1" side carriage 9A has driven-ears 9b and 9b extended from both edges of the middle portion thereof. The driven-ears 9b and 9b are abutted against the edges 2b of the slot 2a formed in the magnetic disk holder 2A. The mounting bracket 7 has a pair of mounting ears 7a, to which a supporting rod 11 is secured. An energizing spring 12A is mounted on the supporting rod 11 to urge the "1" side carriage 9A towards the edge 2b of the slot 2a of the magnetic disk holder 2A.

A "0" side magnetic head 15A is fixedly mounted on the "0" side carriage 1A near the front end through a gimbal 13A, and similarly a "1" side magnetic head 16A on the "1" side carriage 9A near the front end through a gimbal 14A. The gimbals 13A and 14A are made of a flexible, thin metal plate. With the "0" side magnetic head 15A and the "1" side magnetic head 16A, data are recorded in or reproduced from the surface of the magnetic disk (not shown).

A feed motor 17A is provided on the surface of the device frame 3A next to the "0" side carriage 1A, in such a manner that its feed screw 18A is extended in parallel with the guide rod 4A. The feed screw 18A is engaged with a parallel pin 21 which is secured to the prolongation 1b of the "0" side carriage 1A with a retaining plate 19 and a screw 20, so that, as the feed screw 18A turns, the "0" side carriage 1A and the "1" side carriage 9A are moved radially of the magnetic disk.

In the above-described conventional magnetic recording and reproducing device, the "0" side magnetic head 15A is mounted through the gimbal 13A on the surface of the front end portion of the "0" side carriage 1A. Hence, it is necessary to form the gimbal 13A in addition to the "0" side carriage 1A. And, it is also necessary to combine the "0" side magnetic head 15A with the gimbal 13A before it is coupled to the "0" side carriage. Hence, the number of components is relatively large, and the assembling work is rather intricate; that is, there is a limit in reduction of the manufacturing cost.

SUMMARY OF THE INVENTION

In view of the above-described problems accompanying a conventional head feeding mechanism, an object of the invention is to provide a head feeding mechanism for a magnetic recording and reproducing device which is smaller in the number of components and accordingly can be assembled with ease.

The foregoing object of the invention has been achieved by the provision of a head feeding mechanism for a magnetic recording and reproducing device which comprises: a "0" side carriage which has a "0" side magnetic head mounted on the surface of the front end portion thereof, and is fed in the direction of length of a slot formed in a magnetic disk holder, into which a magnetic disk is loaded, by guide means provided on a device frame; and a "1" side carriage which has a "1" side magnetic head mounted on the surface thereof which is confronted with the "0" side magnetic head, a base which is flexibly supported on the base of the "0" side carriage, and driven ears extended from the middle portion thereof which are driven along the edges of the slot with the aid of an energizing spring, wherein the "0" side carriage is rigid, and has a flexible thin portion in the middle of the front end portion thereof which is much smaller in thickness than the other portions, and the "0" side magnetic head is soldered to a flexible printed circuit board with the flexible thin portion held between the "0" side magnetic head and the flexible printed circuit board.

DETAILED DESCRIPTION OF THE PREFERRED EMBODIMENT

Figure 1:
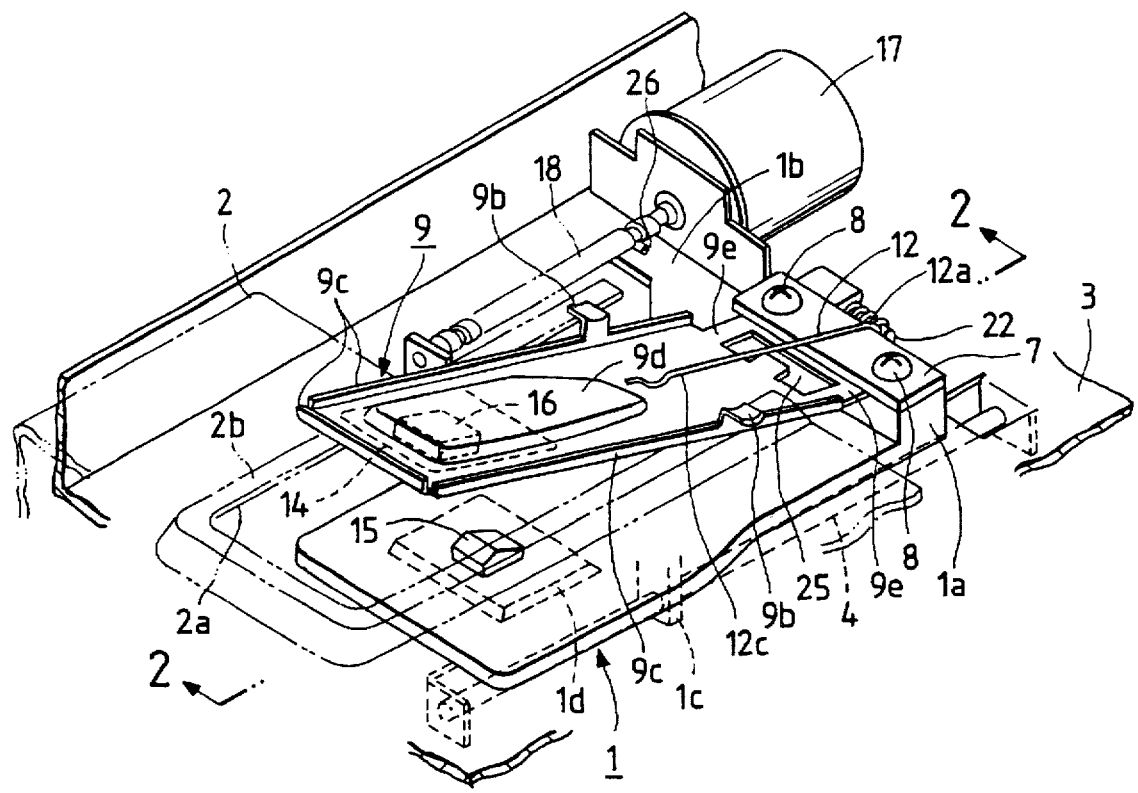
FIG. 1 is a perspective view showing a head feeding mechanism according to the invention with a magnetic disk holder removed.
Figure 2:
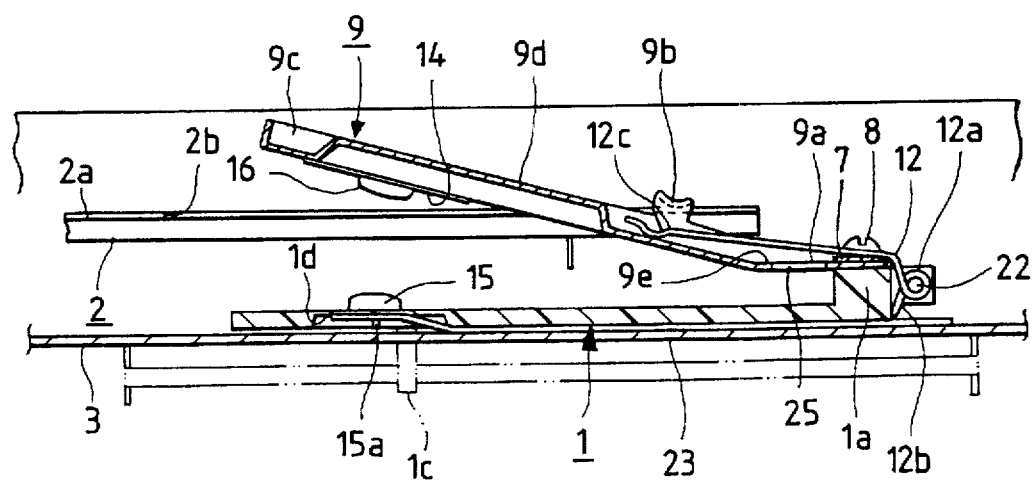
FIG. 2 is a sectional view taken along line 2—2 in FIG. 1.

One preferred embodiment of this invention will be described with reference to FIGS. 1 through 4 in detail.

A "0" side carriage 1 includes a pedestal-shaped base 1a, and has a driven piece 1c which is extended from the lower surface of the middle thereof. The driven piece 1c is guided along a guide rod 4 provided on a device frame 3 which rod is extended in parallel with a slot 2a formed in a magnetic disk holder 2.

Figure 4:
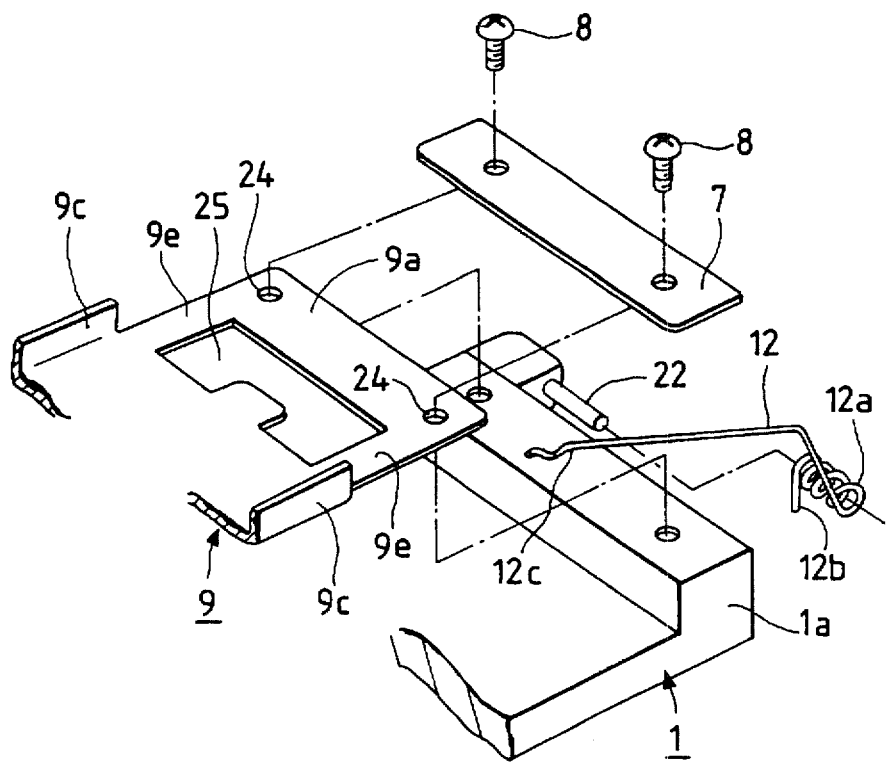
FIG. 4 is an exploded perspective view for a description of the positional relationships between the "0" side carriage and a "1" side carriage in the head feeding mechanism.
Figure 5:
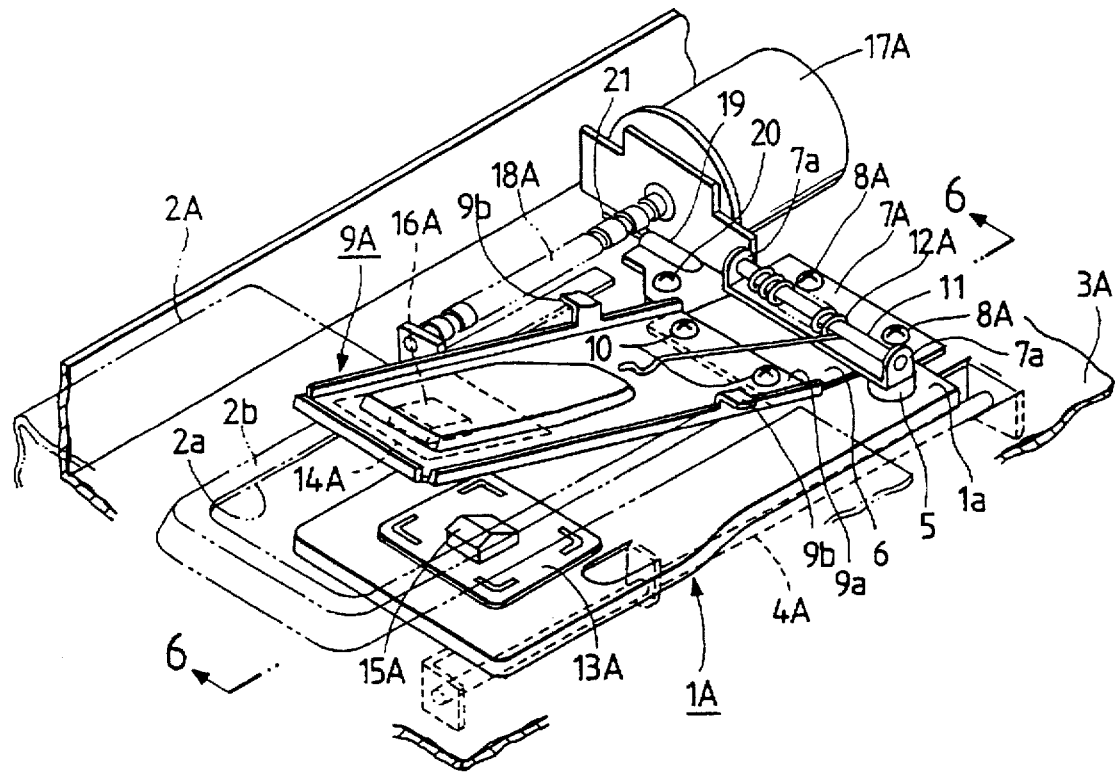
FIG. 5 is a perspective view showing a conventional head feeding mechanism with a magnetic disk holder removed.
Figure 6:
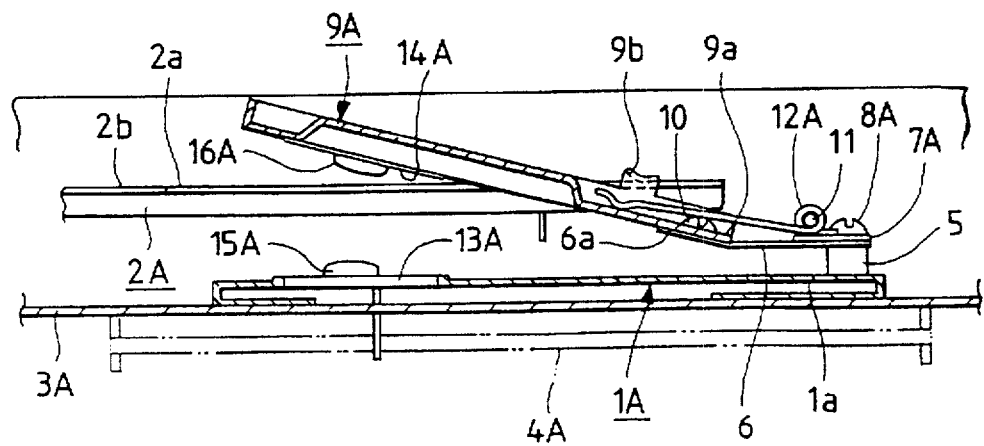
FIG. 6 is a sectional view taken along line 6—6 in FIG. 5.
Figure 7:
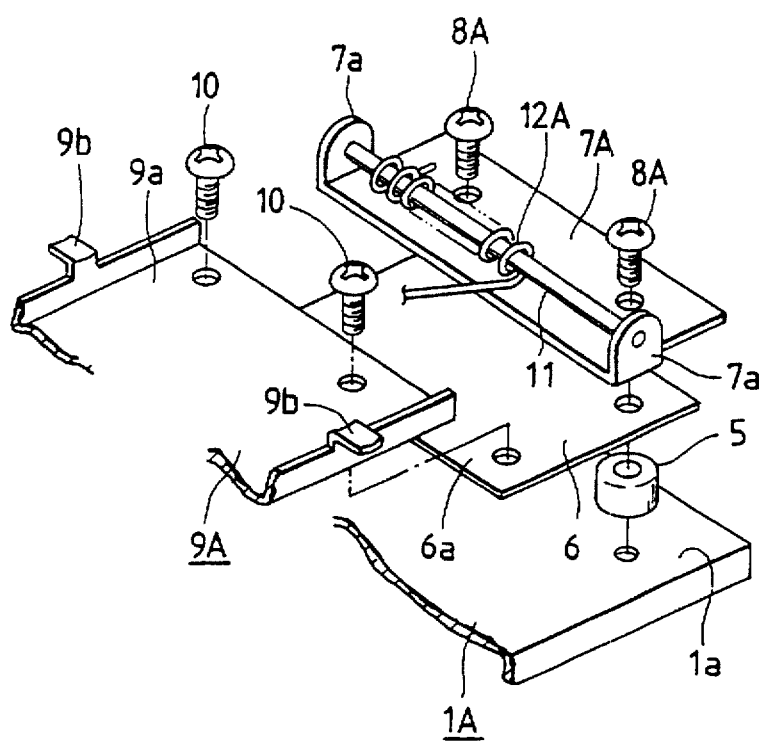
FIG. 7 is an exploded perspective view for a description of the positional relationships between the "0" side carriage and a "1" side carriage in the conventional head feeding mechanism.

As shown in FIG. 4, a supporting pin 22 is extended from the rear surface of the base 1a of the "0" side carriage 1. The supporting pin 22 is adapted to support an energizing spring 12 (described later in detail). The supporting pin 22 is extended perpendicular to the guide rod 4. Hence, the energizing spring 12 can be fixedly coupled to the base 1a of the "0" side carriage 1 by fitting its coil 12a on the supporting pin 22 from the tip.

Figure 3:
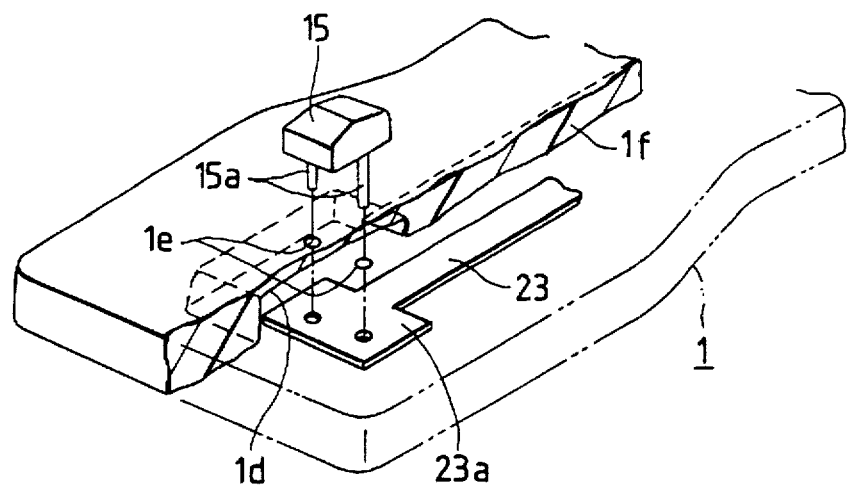
FIG. 3 is an enlarged exploded view showing the front end portion of an "0" side carriage in the head feeding mechanism.

As shown in FIG. 3, the "0" side carriage 1 has a thin portion 1d in the middle of its front end portion which is formed by reducing the thickness sufficiently. The thin portion 1f has through-holes 1e into which the connecting pins 15a of the "0" side magnetic head 15 are inserted. In addition, a groove 1F is formed in the lower surface of the "0" side carriage 1 to accommodate a flexible printed circuit board 23.

Hence, the "0" side carriage 1 and the "0" side magnetic head 15 can be combined with each other as follows: That is, the "0" side magnetic head 15 can be fixedly secured to the "0" side carriage 1 merely by inserting the connecting pins 15a of the "0" side magnetic head into the aforementioned through-holes 1e, and soldering the connecting pins 15a to the front end portion 23a of the flexible printed circuit board 23.

The base 1a of the "0" side carriage 1 is directly secured to the base 9a of a "1" side carriage 9 with a bracket 7 and mounting screws 8. The "1" side carriage 9 is a rigid member formed by pressing, for example, a thin metal plate. More specifically, the peripheral portions of "1" side carriage 9 are raised along its right and left edges and its front edge to form three walls 9c, thus increasing the rigidity of the "1" side carriage 9. The "1" side carriage 9 has an emboss 9d on the upper surface of its front end portion. A "1" side magnetic head 16 is mounted through a gimbal 14 on the emboss 9d. A pair of driven ears 9b are extended from the aforementioned walls 9c formed along the right and left edges of the "1" side carriage 9, respectively, in such a manner that they are abutted against the edge 2b of the slot 2a of the magnetic disk holder 2.

The mounting of the "0" side carriage 1 and the "1" side carriage 9 will be described with reference to FIG. 4.

The base 9a of the "1" side carriage 1 has no wall (9c), but has through-holes 24 into which the fixing screws 8 are inserted. Hence, with the base 9a of the "1" side carriage 9 held between the base 1a of the "0" side carriage 1 and the mounting bracket 7, the base 9a of the "1" side carriage 9 can be fixedly secured to the base 1a of the "0" side carriage 1 by tightening the mounting screws 8.

A U-shaped window 25 is cut in the portion 9e of the "1" side carriage 9 which is near the base 9a. Owing to the U-shaped window 25 the portion 9e is smaller than the other portions in the modulus of section, thus being sufficiently flexible. Hence, the end portion of the "1" side carriage 9 is flexibly supported on the base 1a of the "0" side carriage 1.

The fixing end 12b of the energizing spring 12, the coil 12a of which is supported by the supporting pin 22, is locked to the rear surface of the base 1a of the "0" side carriage 1. On the other hand, the energizing end portion 12c of the energizing spring 12 is pushed against the surface of the "1" side carriage 9. That is, the "1" side carriage 9 is urged towards the edge 2b of the slot 2a of the magnetic disk holder 2 by the elastic force of the energizing spring 12.

A feed motor 17 is set on the surface of the device frame 3 which is next to the "0" side carriage 1. The feed motor 17 has a feed screw 18 which is extended in parallel with the guide rod 4 and is engaged with the driven protrusion 26 of the prolongation 1b which is extended laterally from the "0" side carriage 1. Hence, as the feed screw 18 turns, the "0" side carriage 1 and the "1" side carriage 9 are moved radially of the magnetic disk.

The head feeding mechanism is constructed as described above. Therefore, when the floppy disk (not shown) is inserted into the magnetic disk holder 2, the opening and closing mechanism of the holder 2 releases the shutter of the floppy disk. And when the floppy disk has been completely loaded into the magnetic disk holder 2, the holder 2 is moved downwardly in FIG. 2. As the magnetic disk holder 2 comes down, the "1" side carriage 9 is caused to fall towards the magnetic disk holder 2 by the elastic force of the energizing spring 12, so that the "0" side magnetic head 15 and the "1" side magnetic head 16, which are supported respectively by the "0" side carriage 1 and the "1" side carriage 9, are elastically brought into contact with both surfaces of the magnetic disk. Thus, upon start of the feed motor, data are recorded in or reproduced from the surfaces of the magnetic disk.

In this case, the "0" side magnetic head 15 mounted on the end portion of the "0" side carriage 1 is able to satisfactorily follow the surface of the magnetic disk, because it is supported by the flexible thin portion 1d of the "0" side carriage 1.

As was described above, the "0" side magnetic head 15 can be fixedly secured to the "0" side carriage 1 merely by inserting the connecting pins 15a of the "0" side magnetic head 15 into the aforementioned through-holes 1e, and soldering the connecting pins 15a to the front end portion 23a of the flexible printed circuit board 23.

As was described above, in the head feeding mechanism according to the invention, the middle of the front end portion of the "0" side carriage is formed into the flexible thin portion, and the "0" side magnetic head is directly mounted on the thin portion thus formed. This arrangement dispenses with the use of the expensive gimbal, and eliminates the troublesome work in the prior art that, before being coupled to the "0" side carriage, the "0" side magnetic head and the flexible printed circuit board are combined with the gimbal, with the result that the assembling procedure is simplified as much.

What is claimed is:

1. A head feeding mechanism in a magnetic recording and reproducing device, said magnetic recording and reproducing device including a device frame, guide means provided on the device frame, and a magnetic disk holder having a slot for receiving a magnetic disk loaded therein, said head feeding mechanism comprising:

a first side carriage for feeding in a direction of length of the slot formed in the magnetic disk holder by the guide means provided on the device frame, the first side carriage including:

a base supported on said device frame, said base including a groove and a recess at an end of said groove, said recess forming an unbroken, continuous flexible portion of said base of said first side carriage;

a first side magnetic head mounted directly on said flexible portion; and means for connecting said first side magnetic head to said flexible portion and allowing said head movement relative to said base, wherein said flexible portion is unitarily formed with said base of said first side carriage such that said flexible portion comprises a first surface of said recess and a portion of a second surface of said base of said first side carriage, wherein said second surface is continuous from a first end of said base of said first side carriage to a second end of said base of said first side carriage;

said head feeding mechanism further comprising a second side carriage, said second side carriage including:

a second side magnetic head mounted on a surface of said second side carriage such that said second side magnetic head is confronted with the first side magnetic head; and a base flexibly supported on the base of the first side carriage.

2. A head feeding mechanism as claimed in claim 1, further comprising a flexible printed circuit board, wherein the first side magnetic head is soldered to the flexible printed circuit board with the flexible portion held between the first side magnetic head and the flexible printed circuit board.

3. A head feeding mechanism as claimed in claim 1, further comprising an energizing spring coupled to said base of said first side carriage, wherein the second side carriage includes driven ears extended from a middle portion of said second side carriage, said driven ears being driven along edges of the slot by said energizing spring.

4. A head feeding mechanism according to claim 1, wherein said base of said first side carriage is pedestal-shaped and includes a member for being driven and for being guided by said guide means.

5. A head feeding mechanism according to claim 1, further comprising a spring, wherein said base of said first side carriage includes a pin coupled thereto for mounting said spring onto said first side carriage.

6. A head feeding mechanism according to claim 1, wherein said first side magnetic head includes connecting pins and said flexible portion of said first side carriage includes through-holes formed therein for receiving said connecting pins of said first side magnetic head.

7. A head feeding mechanism according to claim 1, wherein said groove is for accommodating a flexible printed circuit board.

8. A head feeding mechanism according to claim 1, wherein said second side carriage comprises a rigid member.

9. A head feeding mechanism according to claim 8, wherein said second side carriage includes peripheral portions being raised along a plurality of edges to form a plurality of walls.

10. A head feeding mechanism according to claim 9, wherein said second side carriage further comprises an embossed portion on an upper surface of a first end portion, said second side magnetic head being mounted on said embossed portion.

11. A head feeding mechanism according to claim 9, wherein said second side carriage includes driven ears extending from said walls for abutting said slot of said magnetic disk holder.

12. A head feeding mechanism according to claim 1, wherein said second side carriage includes a portion adjacent the base flexibly supported on the base of the base of said first side carriage, said portion having a window formed therein, thereby providing said portion with flexibility.

13. A head feeding mechanism according to claim 1, further comprising a spring having a first end fixed to a rear end of said base of said first side carriage, said spring having a second end for biasing a surface of said second side carriage.

14. A head feeding mechanism according to claim 1, wherein said base flexibly supported on the base of said first side carriage is mounted directly on the base of the first side carriage.

15. A head feeding mechanism according to claim 1, wherein said flexible portion is devoid of slits.

16. A head feeding mechanism according to claim 1, wherein said flexible portion has a thickness less than that of said base of said first side carriage, said thickness allowing elastic movement.

17. A head feeding mechanism in a recording and reproducing device, said recording and reproducing device including a frame, guide means coupled to said frame, and a disk holder having a slot for receiving a disk loaded therein, said head feeding mechanism comprising:

a first side carriage fed in a direction of length of the slot formed in the disk holder by the guide means coupled to the frame, the first side carriage including:

a groove and a recess at an end of said groove, said recess forming an unbroken, continuous flexible portion of said first side carriage;

a first side head for at least one of reading and recording on said disk, said first side head mounted directly on said flexible portion; and means for connecting said first side head to said flexible portion and allowing said head movement relative to said first side carriage, wherein said flexible portion is unitarily formed with said first side carriage such that said flexible portion comprises a first surface of said recess and a portion of a second surface of said first side carriage, wherein said second surface is continuous and unbroken from a first end of said first side carriage to a second end of said first side carriage;

said head feeding mechanism further comprising a second side carriage, said second side carriage including:

a second side head for at least one of reading and recording on said disk, said second side head mounted directly on a surface of said second side carriage such that said second side head is confronted with the first side head; and a base flexibly supported on the first side carriage.

18. A head feeding mechanism as claimed in claim 17, wherein said first side carriage includes a member for being driven and for being guided by said guide means.

19. A head feeding mechanism according to claim 17, wherein said second side carriage includes a portion adjacent the base flexibly supported on said first side carriage, said portion having a window formed therein, thereby providing said portion with flexibility.

20. A head feeding mechanism according to claim 17, wherein said base flexibly support on said first side carriage is mounted directly on the first side carriage.

21. A head feeding mechanism according to claim 17, wherein said flexible portion is devoid of slits.

22. A head feeding mechanism according to claim 17, wherein said flexible portion has a thickness less than that of said first side carriage, said thickness allowing elastic movement.

* * * * *